United States Patent [19]

Ogawa et al.

[11] 4,121,926
[45] Oct. 24, 1978

[54] SQUIRREL-CAGE ROTOR

[75] Inventors: Kazuhiko Ogawa; Masanori Ohara, both of Nagoya, Japan

[73] Assignee: Sumitomo Aluminum Smelting Company, Limited, Japan

[21] Appl. No.: 739,013

[22] Filed: Nov. 4, 1976

[30] Foreign Application Priority Data

Nov. 18, 1975 [JP] Japan .................................. 50-138835

[51] Int. Cl.² .............................................. C22C 21/00
[52] U.S. Cl. ........................................ 75/138; 75/148; 164/113
[58] Field of Search .................... 75/138, 148; 148/32, 148/32.5; 164/113, 119, 138

[56] References Cited

U.S. PATENT DOCUMENTS 1,830,142   11/1931   Taylor et al. .......................... 75/138

Primary Examiner—R. Dean
Attorney, Agent, or Firm—Stevens, Davis, Miller & Mosher

[57] ABSTRACT

A rotor conductor of a squirrel-cage induction motor is made of an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, not more than 0.3% by weight of iron and not more than 0.3% by weight of silicon, the balance being aluminum, said squirrel-cage rotor generating a large starting torque.

10 Claims, 2 Drawing Figures

SQUIRREL-CAGE ROTOR

The present invention relates to a squirrel-cage rotor having a low electric conductivity, in other words, a large starting torque and to the production thereof. More particularly, it relates to a rotor conductor of an squirrel-cage induction motor producing a large starting torque which is improved in hot tear crack in casting and to the production thereof.

A squirrel-cage rotor of an induction motor has the end rings and conducting rods produced by casting or die casting aluminum or an aluminum-base alloy in the slots cut in laminated silicon steel plate. When a high starting torque is required for such motors, for example, to assure frequent starts and stops, the use of electric conductors having a low electric conductivity is required for the secondary rotor.

Consequently, a rotor conductor of a squirrel-cage induction motor having a high starting torque is generally made of an aluminum-base alloy having low electric conductivity. As such aluminum-base alloy, there are well known those having an electric conductivity of less than 40% IACS (International Annealed Copper Standard) such as Al—Mg alloy, Al—Si alloy and Al—Si—Cu alloy. Among those, the Al—Mg alloy has a poor casting property due to the poor fluidity of the molten metal; the Al—Si alloy is inferior in mechanical properties particularly in elongation; and the Al—Si—Cu alloy has a poor corrosion resistance due to copper contained therein. Further, a rotor conductor made of aluminum-base alloys containing silicon or copper (e.g. Al—Si alloy, Al—Si—Cu alloy) shows a great change in electric conductivity because the dissolved silicon or copper in matrix aluminum, which serves to lower the electric conductivity, is precipitated when the rotor made of these alloys is heated. Consequently, the electric conductivity of the rotor conductor becomes thermally unstable.

As the result of a study on the improvement of these defects, various aluminum-base alloys such as Al—Mn, Al—Mn—Ti, Al—Mn—Cr, Al—Mn—Cr—Ti—Zr and the like have been developed. These alloy have a satisfactory thermal stability of electric conductivity. For example, the following result is obtained from the comparison between Al—Si alloy and Al—Mn—Cr alloy both of which have the same electric conductivity of 27% IACS. When both alloys are heated at 250° C. for 2 hours followed by cooling in air, the electric conductivity shows a change of +2% IACS (29% IACS) for the Al—Si alloy while it shows no change for the Al—Mn—Cr alloy.

Further, the mass temperature coefficient of resistance in the range of 20° to 150° C. is $3.18 \times 10^{-3}$ for the Al—Si alloy while it is $1.77 \times 10^{-3}$ for the Al—Mn—Cr alloy. This means that the latter alloy is superior to the former one in the thermal stability of electric resistance. Induction motors generating a large starting torque are often used for applications in which they are turned on and off frequently, for example at a feed roller or elevator. The motors readily generate heat because of their large starting torque. Consequently it is necessary to take into account the fact that the temperature of the motors sometimes rises to about 150° C.

However, these alloys show a high tendency toward hot tear crack in casting. Particularly in aluminum alloys having a relatively low electric conductivity, they show the defect that the quality of the castings becomes poor with increases in the amounts of the alloying elements. For example, the Al—Mn—Cr alloy, which is disclosed in Japanese Patent Publication No. 43,241/1973 and specified to be composed of 0.3 to 4% by weight of manganese, 0.15 to 0.9% by weight of chromium and aluminum as a remainder, shows a significant tendency toward hot tear crack in casting, thus being produced with only a poor yield. On the other hand, when the content of manganese increases, coarse crystals of the intermetallic compounds crystalline out and not a metallic but a rough solidification state is formed inside the castings. Such state makes it difficult to use the castings of these alloys and moreover greatly degrades the mechanical properties.

Consequently, it is a commercial practice to add 0.3 to 0.6% by weight of iron to the Al—Mn—Cr alloy in order to prevent the hot tear crack. It is well known, however, that the addition of iron causes an increase of electric conductivity and a reduction of mechanical properties particularly elongation thereby lowering characteristics of the alloy. Further, the addition of iron does not improve the solidification state at all particularly in the range of high manganese contents.

The inventors have extensively studied ways to improve the tendency toward hot tear crack and the solidification state of squirrel-cage rotors made of Al—Mn—Cr alloy.

An object of the present invention is to provide an aluminum alloy suitable for use as a rotor conductor for a squirrel-cage induction motor having a high starting torque.

Another object of the present invention is to provide a squirrel-cage rotor conductor made of an aluminum alloy having a low tendency toward hot tear crack and a low electric conductivity of less than about 40% IACS.

The other object of the present invention is to provide a squirrel-cage rotor having an improved solidification state and great practical value.

A further object of the present invention is to provide a squirrel-cage rotor superior in the thermal stability of electric resistance, mechanical properties and corrosion resistance.

As the results of the study, it was found that the above described objects can be achieved by producing (1) a rotor conductor for a squirrel-cage induction motor made of an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, not more than 0.3% by weight of iron and not more than 0.3% by weight of silicon, the balance being aluminum, or (2) a rotor conductor of squirrel-cage induction motor made of an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, 0.2 to 0.8% by weight of zirconium, not more than 0.3% by weight of iron and not more than 0.3% by weight of silicon, the balance being aluminum.

Figure 1:
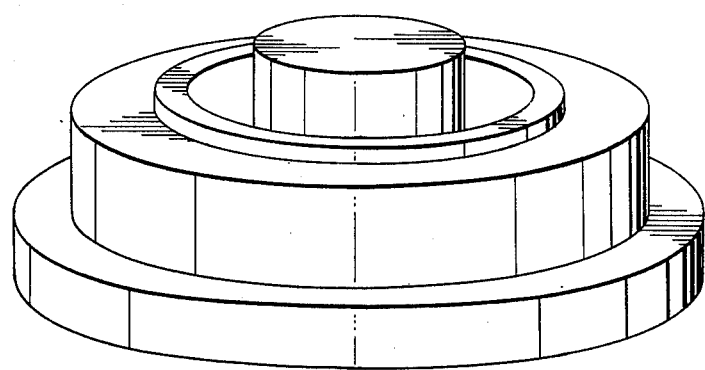
FIG. 1 is a perspective view of a mold made of iron which was used in ring cast test in the Examples hereinafter given.

The present invention will be illustrated in more detail.

Among the alloying elements, the manganese content of 0.3 to 4% by weight was determined for the following reasons. A content of less than 0.3% by weight does not provide an electric conductivity of less than 40% IACS. Manganese in the content of more than 4% by weight may crystallize metallic compounds in the castings thereby lowering the forced dissolution effect (an effect due to the forced dissolution of metal in solid solution) and the effective action on electric conductivity is lost.

The chromium content of 0.15 to 0.9% by weight was determined for the same reasons as in the case of manganese. That is, the contents of less than 0.15% by weight do not provide a required value of electric conductivity, while the contents of more than 0.9% by weight lower the forced dissolution effect and the effective action on electric conductivity is lost.

The addition of titanium alone is not effective, because the inhibiting effect of titanium on hot tear crack is low. The combined use of titanium and boron is very effective for prevention of hot tear crack and improvement of the yield of castings. In this case, further, there is no need to use iron which has conventionally been added for the prevention of hot tear crack. Consequently, no use of iron is very effective for preventing the increase in electric conductivity which is due to the presence of iron.

Further, the combined use of titanium and boron improves the solidification state of the alloy thereby promoting the formation of dense structures in the castings thereof. Therefore, even alloys having a high manganese content are easily usable and the mechanical properties are also much improved as compared with alloys containing neither titanium nor boron.

However, when the contents of titanium and boron used in combination reduce to less than 0.05% by weight and less than 0.01% by weight, respectively, the inhibiting effect on hot tear crack is difficult to observe. While, when the contents of titanium and boron increase to more than 0.6% by weight and more than 0.12% by weight, respectively, the fluidity of molten alloy becomes poor thus resulting in the lowering of productivity.

The addition of titanium and boron may be carried out in the same manner as in other aluminum alloys. For example, they may be added in the form of flux containing both, in the combination of Al—Ti master alloy and Al—B master alloy and in the form of Al—Ti—B master alloy, among which addition of the Al—Ti—B master alloy is particularly preferred.

Further, zirconium is effective for improving the fluidity of the molten alloy and reducing electric conductivity and therefore it is an effective alloying element the addition of which is desirable in the present invention. However, contents of less than 0.2% by weight give only a low effect, while contents of more than 0.8% by weight do not become particularly effective for the reduction of electric conductivity and further make the surface state of castings poor at the time of solidification.

Further, when a manganese content is more than 1.5% by weight, it is known that the addition of both titanium and boron has some negative effects on electric conductivity, however such negative effects can be reduced by the addition of zirconium.

Iron and silicon are impurities unavoidably introduced in the production of alloy. Iron increases electric conductivity and silicon promotes the formation of hot tear crack so that contents of less than 0.3% by weight are necessary for each metal. Further, as for other impurities, allowable contents of each impurity are less than 0.05% by weight and desirable total contents of the impurities are less than 0.1% by weight.

A rotor conductor of a squirrel-cage induction motor having an electric conductivity of less than 40% IACS is obtained with the alloys described above. When a lower electric conductivity, for example less than 20% IACS, is required for the conductor, it can be attained by adding manganese and chromium of 1.5 to 4% by weight and 0.5 to 0.9% by weight, respectively. When such a particularly low electric conductivity is required for the alloy, the addition of zirconium within the foregoing range may be more effective for preventing the increase in electric conductivity due to the addition of titanium and boron.

In the preparation of squirrel-cage rotors with these alloys, any casting method, for example, pressure die casting, gravity die casting and so on, may be used so far as it has the forced dissolution effect on the alloying elements which are added for obtaining a required electric conductivity. Among these methods, pressure die casting has the highest forced dissolution effect and therefore is commonly used. Also in the present invention, this method is desirable.

In the casting, it should be taken into account that the foregoing alloys have a solidification temperature of primary crystal in the vicinity of 650° to 660° C. When the temperature of alloy in the molten state is less than 700° C. and generally about 650° to 670° C. (the temperature applied to commonly used Al—Si alloy), crystallization of manganese and chromium, which are the major alloying elements, is easily induced, thus giving no desired electric conductivity. Consequently, suitable temperatures of molten alloy in casting are more than 720° C. Too high temperatures are accompanied by soldering between castings and mold, increase in the amount of gas absorbed and danger of operation. Consequently, the upper limit of the molten-alloy temperature is of course limited and temperatures of less than about 800° C. are preferred even in the case of alloys having a high content of alloying elements and a low electric conductivity.

For pre-heating a mold, commonly used temperatures of about 200° to 300° C. are sufficient. Laminated silicon steel plate to be inserted may be pre-heated, but the pre-heating is not always necessary for promoting the forced dissolution of alloying elements. Further, the use of a parting agent is preferred for prevention of soldering.

As for the rate of injection of molten alloy in the pressure die casting process, a relatively slow rate of about 30 to 50 m/sec is preferred. When the rate is 60 to 70 m/sec as commonly used in the pressure die casting, air bubbles introduced in the end rings and fins become excessive. In this case, it may be found that the electric properties and mechanical properties of squirrel-cage rotors become poor.

The squirrel-cage rotors thus obtained have no hot tear crack in casting, keep a good solidification state and have an electric conductivity of 40 to 14% IACS. Therefore the rotors have an excellent practical value. Further they are superior in the thermal stability of electric conductivity, mechanical properties and corrosion resistance and further the fluidity of the molten alloy is not damaged in the production of the rotors.

The present invention will be illustrated with reference to the following examples, which are not however intended to limit the invention thereto.

EXAMPLES 1 TO 9

The alloys having the compositions in Table 1 were produced by the gravity die casting process and tested for tension and electric conductivity. The electric conductivity was measured by means of a potentiometer or eddy-current type electric conductivity tester.

Figure 2:
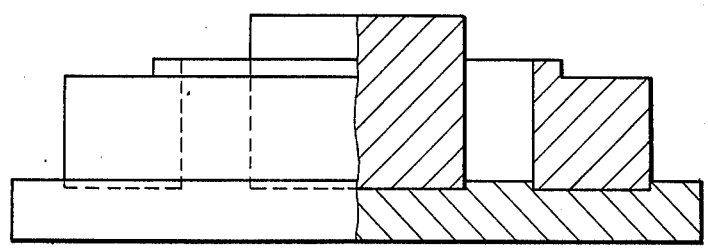
FIG. 2 is a cross-sectional view of the mold shown in FIG. 1.

Next, the so-called ring cast test was carried out as follows: the same molten alloys were cast in an iron mold maintained at room temperature, said mold having a core at the center thereof, and the thus obtained ring castings (36 mm in internal diameter, 58 mm in external diameter and 20 mm in height) were tested for the tendency toward hot tear crack. The sketch of the mold used in the ring cast test is shown in the accompanying FIGS. 1 and 2. In the ring cast test, the test results were evaluated in five ratings, 1, 2, 3, 4, and 5, in which 5 means a complete breaking at the ring portion and 1 means no breaking, with three ratings, 2, 3, and 4, between 1 and 5. The tendency toward hot tear crack was evaluated by the average of a plural number of test values.

Table 2 shows the mechanical properties and electric conductivity of the test alloys and the results of the ring cast test.

Table 1

| No. | Fe | Si | Mn | Cr | Ti | B | Zr | Al |
|---|---|---|---|---|---|---|---|---|
| Ex. 1 | 0.26 | 0.10 | 0.38 | 0.14 | 0.11 | 0.02 | — | remainder |
| 2 | 0.21 | 0.10 | 0.44 | 0.27 | 0.09 | 0.02 | — | " |
| 3 | 0.22 | 0.11 | 0.53 | 0.26 | 0.18 | 0.04 | — | " |
| 4 | 0.25 | 0.13 | 1.45 | 0.25 | 0.20 | 0.04 | — | " |
| 5 | 0.28 | 0.15 | 1.62 | 0.26 | 0.10 | 0.02 | — | " |
| 6 | 0.21 | 0.07 | 1.72 | 0.58 | 0.10 | 0.02 | — | " |
| 7 | 0.18 | 0.10 | 2.72 | 0.55 | 0.19 | 0.04 | 0.32 | " |
| 8 | 0.25 | 0.19 | 3.57 | 0.57 | 0.39 | 0.07 | 0.35 | " |
| 9 | 0.23 | 0.16 | 3.68 | 0.57 | 0.35 | 0.07 | 0.65 | " |
| Comparative Ex. 1 | 0.25 | 0.10 | 0.37 | 0.12 | — | — | — | " |
| 2 | 0.37 | 0.10 | 0.52 | 0.26 | — | — | — | " |
| 3 | 0.25 | 0.10 | 1.25 | 0.41 | — | — | — | " |
| 4 | 0.23 | 0.10 | 1.70 | 0.56 | — | — | — | " |

Table 1-continued

| No. | Fe | Si | Mn | Cr | Ti | B | Zr | Al |
|---|---|---|---|---|---|---|---|---|
| 5 | 0.50 | 0.08 | 1.82 | 0.58 | — | — | — | remainder |
| 6 | 0.19 | 0.10 | 2.72 | 0.58 | — | — | — | " |
| 7 | 0.24 | 0.22 | 3.30 | 0.54 | — | — | — | " |
| 8 | 0.20 | 0.07 | 1.63 | 0.55 | — | — | 0.32 | " |
| 9 | 0.56 | 0.08 | 1.78 | 0.60 | 0.10 | 0.02 | — | " |
| 10 | 0.31 | 0.16 | 1.58 | 0.48 | 0.18 | — | — | " |
| 11 | 0.27 | 0.17 | 1.71 | 0.62 | 0.12 | — | 0.31 | " |

Table 2

| No. | Tension strength (kg/mm²) | Elongation (%) | Electric conductivity % IACS | Ring cast test | (Remark) Measuring apparatus for electric conductivity |
|---|---|---|---|---|---|
| Example 1 | 9.8 | 47.0 | 35.4 | 1.0 | eddy-current tester |
| 2 | 10.5 | 46.0 | 30.6 | 1.0 | " |
| 3 | 11.0 | 44.4 | 29.2 | 1.0 | " |
| 4 | 13.8 | 36.4 | 19.7 | 1.0 | " |
| 5 | 13.9 | 34.2 | 20.2 | 1.0 | " |
| 6 | 11.5 | 13.5 | 18.5 | 1.0 | potentiometer |
| 7 | 10.5 | 3.0 | 16.6 | 1.0 | " |
| 8 | 11.0 | 2.7 | 15.7 | 1.0 | " |
| 9 | 7.9 | 0.9 | 14.9 | 1.0 | " |
| Comparative Example 1 | 9.0 | 43.1 | 37.2 | 2.0 | eddy-current tester |
| 2 | 10.2 | 46.5 | 31.2 | 2.2 | " |
| 3 | 13.1 | 37.3 | 20.5 | 2.8 | " |
| 4 | 11.9 | 10.5 | 17.9 | 4.6 | potentiometer |
| 5 | 9.1 | 4.6 | 22.1 | 3.8 | " |
| 6 | 4.2 | 1.2 | 15.0 | 2.2 | " |
| 7 | 3.2 | 0.5 | 13.7 | 1.4 | " |
| 8 | 11.3 | 12.7 | 16.0 | 2.6 | " |
| 9 | 11.7 | 10.4 | 22.1 | 1.0 | " |
| 10 | 11.8 | 14.0 | 18.8 | 1.5 | " |
| 11 | 11.5 | 13.2 | 18.0 | 1.8 | " |

As is apparent from Table 2, the present invention is remarkably effective for improving the hot tear crack of aluminum alloys having an electric conductivity of about 40 to 14% IACS. In comparative Example 9, the hot tear crack is improved but the alloy may be considered as unsuitable because the electric conductivity increases owing to the increase in iron content.

The alloy in Comparative Example 7 containing manganese of more than 3% and neither titanium nor boron was not suitable for a practical use, because the coarse crystals of intermetallic compounds crystallized out and a rough solidification state was formed inside the castings (these defects are not particularly shown as data in Table 2). The alloys other than Comparative Example 7 had a relatively dense solidification state.

EXAMPLES 10 TO 11

The alloys having the compositions in Table 3 were cast by the gravity die casting process and pressure die casting process and tested for tension and electric conductivity. The electric conductivity was measured by means of a potentiometer. The results are shown in Table 4.

Table 3

| No. | Fe | Si | Mn | Cr | Ti | B | Zr | Al |
|---|---|---|---|---|---|---|---|---|
| Ex. 10 | 0.16 | 0.24 | 2.90 | 0.69 | 0.24 | 0.05 | — | remainder |
| 11 | 0.18 | 0.23 | 2.72 | 0.61 | 0.20 | 0.04 | 0.30 | " |
| Comparative Ex. 12 | 0.18 | 0.25 | 2.73 | 0.61 | — | — | — | " |

Table 4

| No. | Mechanical properties | | | | | | Electric conductivity (% IACS) | |
|---|---|---|---|---|---|---|---|---|
| | Gravity die-cast sample | | | Pressure die-cast sample | | | | |
| | Tensile strength (kg/mm$^2$) | 0.2% yield point (kg/mm$^2$) | Elongation (%) | Tensile strength (kg/mm$^2$) | 0.2% yield point (kg/mm$^2$) | Elongation (%) | Gravity die-cast sample | Pressure die-cast sample |
| Example 10 | 12.0 | 7.1 | 7.8 | 16.3 | 12.3 | 11.3 | 18.5 | 16.5 |
| 11 | 12.3 | 7.6 | 7.5 | 17.6 | 13.7 | 11.3 | 17.4 | 15.1 |
| Comparative Example 12 | 9.1 | 6.6 | 3.3 | 16.4 | 12.8 | 9.8 | 16.9 | 16.2 |

As is apparent from Table 4, the present invention provides die castings superior in both mechanical properties and electric conductivity.

From the comparison of Examples 1 to 9 with Comparative Examples 1 to 11, it is observed that, in the prior art which uses neither titanium nor boron or neither both metals nor zirconium, the tendency toward hot tear crack is higher and the cracks are more easily produced in the pressure die casting. Consequently, it is apparent that the squirrel-cage rotors of the present invention are far superior in various properties to those obtained by the prior art.

What is claimed is:

1. A rotor conductor of a squirrel-cage induction motor made of an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, not more than 0.3% by weight of iron and not more than 0.3% by weight of silicon, the balance being aluminum, said alloy preventing hot tear cracks and reducing the electrical conductivity of said rotor conduction thereby providing a motor having a high starting torque.

2. The rotor conductor of a squirrel-cage induction motor of claim 1, wherein said manganese is 1.5 to 4% by weight and said chromium is 0.5 to 0.9% by weight.

3. A rotor conductor of a squirrel-cage induction motor made of an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, 0.2 to 0.8% by weight of zirconium, not more than 0.3% by weight of iron and not more than 0.3% by weight of silicon, the balance being aluminum, said alloy preventing hot tear cracks and reducing the electrical conductivity of said rotor conduction thereby providing a motor having a high starting torque.

4. The rotor conductor of a squirrel-cage induction motor of claim 3, wherein said manganese is 1.5 to 4% by weight and said chromium is 0.5 to 0.9% by weight.

5. The method of producing squirrel-cage rotors by casting an aluminum-base alloy in the slots cut in laminated silicon steel plate, wherein the improvement comprises using an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, not more than 0.3% by weight of iron and not more than 0.3% by weight of silicon, the balance being aluminum, the use of said alloy preventing hot tear cracks and reducing the electrical conductivity of said rotor thereby providing a motor having a high starting torque.

6. The method of claim 5, wherein said manganese is 1.5 to 4% by weight and said chromium is a 0.5 to 0.9% by weight.

7. The method of claim 5, wherein said casting is a pressure die casting.

8. The method of producing squirrel-cage rotors by casting an aluminum-base alloy in the slots cut in laminated silicon steel plate, wherein the improvement comprises using an aluminum-base alloy consisting essentially of 0.3 to 4% by weight of manganese, 0.15 to 0.9% by weight of chromium, 0.05 to 0.6% by weight of titanium, 0.01 to 0.12% by weight of boron, 0.2 to 0.8% by weight of zirconium, not more than 0.3% by weight of iron and not more than 0.3% by weight of silicon, the balance being aluminum, the use of said alloy preventing hot tear cracks and reducing the electrical conductivity of said rotor thereby providing a motor having a high starting torque.

9. The method of claim 8, wherein said manganese is 1.5 to 4% by weight of said chromium is 0.5 to 0.9% by weight.

10. The method of claim 8, wherein said casting is a pressure die casting.

* * * * *